United States Patent
Mongazon-Cazavet et al.

(10) Patent No.: US 7,761,082 B2
(45) Date of Patent: Jul. 20, 2010

(54) CONTROL DEVICE TO TRANSFER UNITS OF CONNECTION TIME BETWEEN DONOR AND BENEFICIARY TERMINALS OF COMMUNICATION NETWORK(S)

(75) Inventors: Bruno Mongazon-Cazavet, St Michel-sur-Orge (FR); Laurent Clevy, Chartres (FR)

(73) Assignee: Alcatel, Paris (FR)

( * ) Notice: Subject to any disclaimer, the term of this patent is extended or adjusted under 35 U.S.C. 154(b) by 1065 days.

(21) Appl. No.: 11/455,694

(22) Filed: Jun. 20, 2006

(65) Prior Publication Data

US 2007/0042751 A1 Feb. 22, 2007

(30) Foreign Application Priority Data

Jun. 23, 2005 (FR) .................................. 05 51724

(51) Int. Cl.
*H04M 11/00* (2006.01)
*H04M 15/00* (2006.01)
(52) U.S. Cl. .................... 455/405; 455/407; 379/114.16
(58) Field of Classification Search .............. 379/111, 379/114.01, 114.16, 114.2, 114.22, 114.26, 379/121.03, 124, 130, 114.17, 114.21; 455/405–409, 455/414.1, 414.3, 419, 420
See application file for complete search history.

(56) References Cited

U.S. PATENT DOCUMENTS

| | | | |
|---|---|---|---|
| 6,424,706 B1 | 7/2002 | Katz et al. | |
| 6,564,047 B1 | 5/2003 | Steele et al. | |
| 6,999,750 B2 * | 2/2006 | Aoyama et al. | 455/406 |
| 7,269,251 B1 * | 9/2007 | Jokinen | 379/114.2 |
| 7,295,658 B2 * | 11/2007 | Moon et al. | 379/114.2 |
| 7,492,880 B2 * | 2/2009 | Rodriguez et al. | 379/114.22 |
| 2003/0045267 A1 | 3/2003 | Himmel et al. | |
| 2006/0093106 A1 * | 5/2006 | Rodriguez et al. | 379/114.01 |
| 2008/0175363 A1 * | 7/2008 | Rodriguez et al. | 379/114.21 |
| 2009/0034703 A1 * | 2/2009 | Halford | 379/114.2 |

FOREIGN PATENT DOCUMENTS

WO 2004/015973 2/2004

* cited by examiner

*Primary Examiner*—Binh K Tieu
(74) *Attorney, Agent, or Firm*—Carmen Patti Law Group, LLC

(57) ABSTRACT

A device (D) is dedicated to controlling the transfer of units of connection time for a communication network (N1) having accounting and/or billing equipment (ABE1). This device (D) includes processing means (PM) that, when they receive a request to transfer a chosen quantity of units of connection time to a beneficiary account associated with the communication identifier of a first communication terminal (BT) connected to a communication network (N1), responsible for accessing a first set of accounting and/or billing equipment (ABE1) managing the account of a donor associated with the communication identifier of a second communication terminal (DT) connected to the communication network (R1), to verify whether the quantity of units of connection time that the donor's terminal (DT) has is at least equal to the chosen quantity, and if so, to order the first set of equipment (ABE1), which also manages the beneficiary's account, to transfer in real time a quantity of units of connection time at most equal to the quantity chosen from the donor's account to the beneficiary's account.

25 Claims, 2 Drawing Sheets

CONTROL DEVICE TO TRANSFER UNITS OF CONNECTION TIME BETWEEN DONOR AND BENEFICIARY TERMINALS OF COMMUNICATION NETWORK(S)

BACKGROUND OF THE INVENTION

The invention concerns communication networks, more specifically the allocation of units of connection time to communication terminals connected to communication networks, particularly the mobile (or cellular) type. "Communication terminal" means any fixed or mobile (or portable) communication equipment capable of exchanging data in the form of signals while consuming units of connection time (assigned to its communication identifier), either with another terminal or network equipment over their communication network(s) or with its own communication network. It may therefore concern, for example, fixed or mobile telephones or fixed or portable computers or personal digital assistants (or PDA) equipped with a communication module.

"A unit of connection time" here means the equivalent in communication (or connection) time of a set amount of money.

Many network operators, particularly the mobile (or cellular) type, offer their customers rate plans that allow them to establish communication whose cumulative duration (which corresponds to a quantity of units) is predefined, generally over a set period. For example, there are rate plans offering two or three hours of communication per month, or one hour of communication over an unlimited period of time.

When a customer has a rate plan and has used up almost all of the units before the period expires, several solutions are offered to him. For example, he can continue to consume units, which will be billed to him by the operator at the expiration of the period in the form of an added cost, based on the number of units consumed over and above the predefined quantity. He can borrow the communication terminal of another person who has not yet used up the units in his rate plan. He can also buy units from his operator, or ask another person to buy him units from his operator.

None of these solutions allows a user to have units of connection time at his disposal at all times, in a fast, safe way, remotely and without being billed.

The purpose of the invention is therefore to improve the situation, and particularly to allow a donor customer to transfer at least some of his unused units to the account of a beneficiary who is a customer of his operator or another operator.

SUMMARY OF THE INVENTION

For this purpose, it proposes a transfer control device for units of connection time, for a communication network that has accounting and/or billing equipment, with means of processing that are instructed, when they receive a request to transfer a chosen quantity of units of connection time to a beneficiary account (associated with the communication identifier of a first communication terminal connected to a communication network), to access the accounting and/or billing equipment, which manages a donor account (associated with the communication identifier of a second communication terminal connected to another potential communication network), in order to check whether the quantity of units of connection time that the donor terminal has is at least equal to the quantity chosen, and if so, to order the first equipment, and potentially other accounting and/or billing equipment that manages the beneficiary account, to proceed with a real-time transfer of a quantity of units of connection time at least equal to the chosen quantity from the donor account to the beneficiary account.

The control device in the invention can have other features, which may be taken separately or in combination, specifically:

It can have memory means of storing data in look-up tables between identifiers of the donor's communication terminal and at least one identifier of the beneficiary's communication terminal;

the look-up tables can have data indicating that a donor does (or does not) authorize transfers of units to any communication terminal;

the look-up tables can have data representative of the quantity of units of connection time that can be transferred to the account of each designated beneficiary;

the look-up tables can have data representative of the quantity of units of connection time that can be transferred to each beneficiary either during a chosen period of time or at each request to transfer units;

the look-up tables can include data indicating that a donor authorizes transfers of units to a beneficiary with no procedure for a request for prior authorization;

the look-up tables can have data indicating that a donor authorizes a beneficiary terminal to use an emergency procedure to request a transfer of units when his account no longer has enough units to make a normal request for a transfer of units; this emergency procedure is charged to the donor's account (in terms of consumption of units) and takes place with no prior authorization request procedure. In this case, the means of processing are instructed, when they detect an emergency procedure to request a transfer of units coming from a beneficiary terminal whose beneficiary account does not have a sufficient number of units to make a normal request for a transfer of units at its expense, but is authorized by a donor to use this emergency procedure, to authorize the use of the emergency procedure and to order the accounting and/or billing equipment that manages the account of the donor terminal to debit that account by a quantity of units of connection time that corresponds to the cost of the emergency procedure;

the look-up tables can have data indicating that a donor authorizes transfers of units to a beneficiary after a request for prior authorization;

the look-up tables can have data indicating that a donor does not authorize a beneficiary to be given the identifier of his communication terminal and/or his name;

his processing means can be instructed to process a request to transfer units that comes from a donor's communication terminal designating at least one beneficiary terminal and a chosen quantity of units;

his processing means can be charged to process a request for a transfer of units from a beneficiary's communication terminal that designates a chosen quantity of units;

when they receive a request to transfer a chosen quantity of units that does not designate any identifier of the donor communication terminal and comes from a beneficiary communication terminal whose identifier is associated with at least two identifiers of donor communication terminals in the look-up table, his processing means can be instructed to propose that the communication terminal of the requesting beneficiary select one of these donors;

is processing means can be instructed to determine at least one donor from among several possible ones based on at least one chosen criterion, in such a way as to propose to the requesting beneficiary terminal each donor verifying each criterion chosen. For example, the criteria chosen are: the availability of the communication terminal, the level of priority, and the quantity of units available;

his processing means can be instructed to reject a request to transfer units in the event of refusal by the selected donor terminal or in the absence of a response by the selected donor terminal for a period greater than a chosen threshold;

if a donor terminal agrees to transfer a quantity of units less than the quantity chosen, its processing means can be instructed to order the transfer of the quantity of units granted by the donor's account to the beneficiary's account, potentially after sending the beneficiary's communication terminal a request to agree to the quantity of units granted, after receiving the consent of the donor terminal;

when they receive a request to transfer units from a beneficiary terminal, its processing means can be instructed to access the accounting and/or billing equipment that manages the beneficiary terminal's account and authorize the transfer when the quantity of units stored in the beneficiary account is less than a chosen threshold;

its processing means can be instructed to order the accounting and/or billing equipment that manages the account of the donor terminal to debit that account by a quantity of units of connection time that corresponds to the cost of the communication initiated by the beneficiary terminal, without the beneficiary's account being debited, so that the communication is charged to the donor terminal;

when the quantity of units available in the account of the donor terminal involved in the transfer is less than the quantity chosen, its processing means can be instructed to send the donor terminal an offer to buy units of connection time, and, if the donor terminal agrees, to send a request to the accounting and/or billing equipment that manages the account of the donor terminal to assign that account a specified quantity of units, bill the donor, and then order the units transferred;

when a transfer of units requires the prior consent of the donor terminal, its processing means can be instructed to order the transfer of units if the consent of the donor terminal is accompanied by a confidential password;

its processing means can be instructed to process requests to transfer units that come in the form of telephone calls or short SMS ("Short Message Service") type messages or even electronic messages or services;

its processing means can be instructed to communicate with the donors' and/or beneficiaries' communication terminals by means of SMS-type short messages;

the first and second communication terminals can be connected to the same network, belonging to an operator. In this case, the donor account and the beneficiary account are managed by the same accounting and/or billing equipment, accessible by a communication identifier. As a variation, the first and second communication terminals may be connected to different networks, belonging to different operators. In this case, the donor account and the beneficiary account are managed by different accounting and/or billing equipment, accessible by different communication identifiers.

The invention also proposes a process for transferring units of connection time where each time the dedicated network equipment receives a request to transfer a chosen quantity of units of connection time to a beneficiary account (associated with the communication identifier of a first communication terminal connected to a communication network), it accesses the accounting and/or billing equipment that manages the donor account (associated with the communication identifier of a second communication terminal connected to another potential communication network), in order to check whether the quantity of units of connection time that the donor terminal has is at least equal to the quantity chosen, and if so, to order the first equipment and potentially other accounting and/or billing equipment that manages the beneficiary account to proceed with a real-time transfer, from the donor account to the beneficiary account, of a quantity of units of connection time at most equal to the quantity chosen.

BRIEF DESCRIPTION OF THE DRAWINGS

The invention is particularly well suited, although not exclusively suited for mobile or cellular communication networks. The invention actually concerns all communication networks whose rates and usage are based on a system of credits for units of time assigned to the communication identifier of the communication terminals connected to them.

Other features and advantages of the invention will appear from an examination of the detailed description below and the attached drawings in which.

DETAILED DESCRIPTION OF THE INVENTION

The attached drawings can serve not only to supplement the invention, but also to help describe it, if need be.

The purpose of the invention is to allow the transfer to the account of a communication terminal that belongs to a beneficiary and is connected to a communication network, of at least some of the units of connection time stored there to the account of another communication terminal that belongs to a donor and is connected to that same communication network or to another, at the initiative of the donor or the beneficiary.

The following non-limiting example considers each communication network a mobile (or cellular) network, like for example a UMTS-type network. But the invention is not limited to this type of mobile network. It actually concerns all types of mobile networks, particularly the GSM, GPRS/EDGE, CDMA 2000 or WCDMA types. The invention is not limited to mobile networks either. It actually concerns all types of communication networks, fixed or wireless, in which communication terminals have a quantity of units of connection time, set by a rate plan (for example), to establish communication.

The following also considers the communication terminals involved in the transfer of units (of connection time) mobile terminals. But the invention is not limited to this type of communication terminal. It actually concerns all stationary or mobile (or portable) communication equipment that can exchange data in the form of signals while consuming units of connection time.

Figure 1:
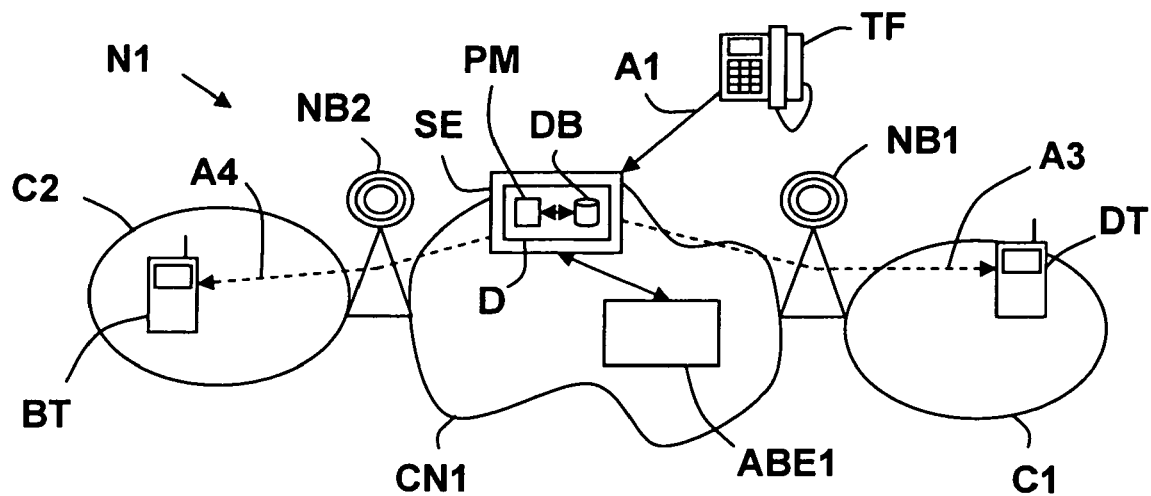
FIG. 1 shows, in a very schematic way, a mobile network equipped with one embodiment of the control device in the invention, and the connections between communication terminals and said device that make it possible to register a mobile terminal as a donor.

Please refer first to FIG. 1 to see an initial example of how the invention is used in a single mobile network N1 that has accounting and/or billing equipment ABE-1 traditionally responsible for managing the accounts of clients with mobile terminals and billing them. Each of the network N1 operator's clients has a mobile terminal with a communication identifier, like a telephone number for example, and can consume, according to their rate plan, a predefined quantity of units (of connection time) stored in an account managed by the ABE-1 accounting and/or billing equipment and associated with the communication identifier of the mobile terminal.

The invention proposes installing a control device D for transferring units of connection time within a communication network N1. This device can be installed in service equipment SE, like a service server for example, itself installed in the core network CN1, or coupled to it.

This device D has a processing module PM instructed, each time it receives a request to transfer a chosen quantity of units of connection time to the account of a mobile terminal BT belonging to a beneficiary client, to access the ABE-1 equipment (which manages the accounts of the mobile terminals of the donor clients and beneficiary clients here) to check whether the quantity of units of connection time that the donor terminal has is at least equal to the quantity of units chosen and if so, to order the ABE1 equipment to proceed with a real-time transfer of a quantity of units of connection time at least equal to the chosen quantity from the account of the donor terminal to the account of the beneficiary terminal.

Preferably, only clients who are registered with the device D can act as donors and thus take advantage of the (free or paid) service for transferring units that is offered by their connection network N1.

The registration procedure consists of giving the operator of the network N1 at least the communication identifier of a mobile terminal MT of a donor client.

From here on, the "donor terminal" is called DT and the "beneficiary terminal" BT. Similarly, the accounts are called the "donor account" and the "beneficiary account."

The data specifying the communication identifier of a donor terminal DT are stored in memory means DB of the device D, which can come in any form, particularly in the form of a database.

Much other (optional) data can be stored in the database DB, such as data defining the communication identifiers of the donor terminals DT, in such a way as to form a look-up table. Thus, data can be provided that indicate that the donor account can be used to transfer units to any beneficiary account. As a variation, data can be provided that indicate that a donor account can be used only to transfer units to at least one beneficiary account. Data can also be provided that indicate that the communication identifier of a donor terminal DT and/or the name of the donor can or cannot be communicated to a beneficiary client. Data can also be provided that set the quantity of units from a donor account that can be transferred to a beneficiary account either at each transfer or in a chosen period of time. Data can also be provided that define a password for the donor client. Data can also be provided that indicate that the donor client authorizes transfers of units (according to the terms specified by other optional data) without the donor terminal DT being subject to a request for prior authorization. Data can also be provided indicating that the donor client wishes to extend the transfer service to one or more other operators so that beneficiary terminals connected to the communication networks of operators other than his can transfer units. Data can also be provided that set levels of priority between donor terminals.

It is important to note that a donor terminal's (communication) identifier can be associated with several beneficiary terminal identifiers and that, conversely a beneficiary terminal identifier can be associated with several donor terminal identifiers.

All these data, intended to be stored in the database DB, can be communicated to the operator by any means whatsoever, particularly by mail, potentially electronic, by telephone, or orally in one of the operator's agencies.

In the example illustrated in FIG. 1, the donor client uses a stationary telephone ST (arrow F1) to communicate the data necessary to transfer units to the service equipment SE that contains the device D. The service equipment SE can, for example, have a voice server guiding the donor client in providing essential data (identifier of donor terminal DT and preferably password) and optional data. In one variation, the donor client could use his mobile telephone DT, which is momentarily located here in cell C11 of network N1 controlled by Node B NB1 of network N1.

Once the client has finished sending his transfer data, they are stored in the database of the device D. The client's terminal is then registered as a potential donor.

Preferably, once a client terminal has been registered with the device D, the processing module PM of the latter generates a message to the donor terminal DT designated by the client to let him know that he has been registered as a donor and that he can now be involved in transfers of units, and/or, if the donor client authorizes it, a message intended for each beneficiary terminal BT potentially designated by the client, to let them know that a donor has designated them as a potential beneficiary and that they can now take advantage of transfers of units.

For example, as illustrated in FIG. 1, short SMS-type ("Short Message Service") messages can be generated by the processing module PM intended for the donor terminal DT (arrow with dashes F2) and/or the beneficiary terminal BT (arrow with dashes F3).

Requests to transfer units can be made at the initiative of either a donor terminal DT or a beneficiary terminal BT.

Figure 2:
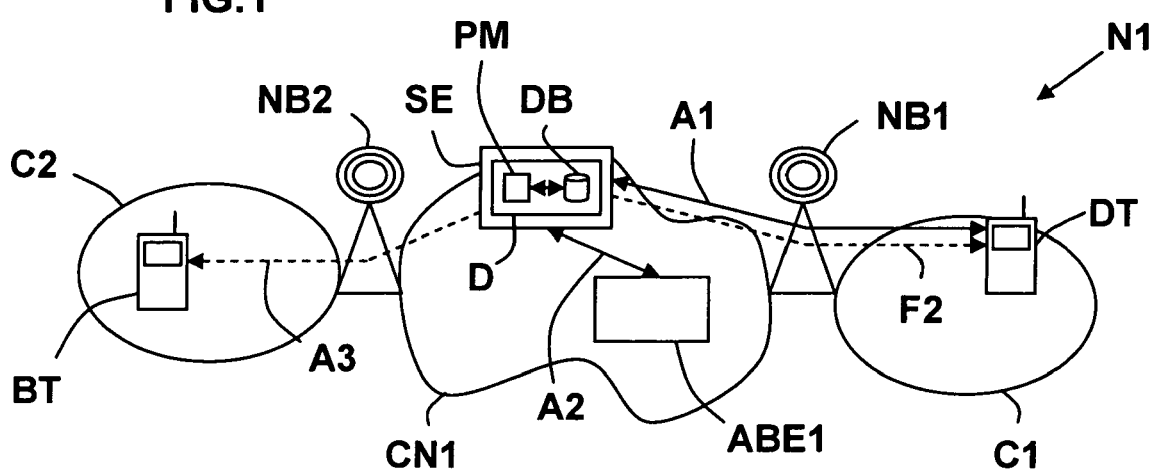
FIG. 2 shows, in a very schematic way, a mobile network equipped with one embodiment of the control device in the invention, and the connections between communication terminals and said device that make it possible for a mobile donor terminal, on its own initiative, to transfer units of connection time from its own account to the account of a mobile beneficiary terminal.

Please refer now to FIG. 2 to see an example of a transfer of units at the initiative of a donor terminal DT.

In this example, the user of a donor terminal DT (here momentarily located in cell C11 of network N1) wants to transfer a chosen quantity of units from his donor account to the beneficiary account of a beneficiary terminal BT (here momentarily located in cell C12 of network N1). To do so, the donor terminal DT can, for example, establish a radio telephone link with the device D (in fact with the service equipment SE in which it is installed which can be reached by means of his communication identifier), via Node B NB1, which controls cell C11 in which he is located (arrow F1). This link F1 allows the donor terminal DT to send the processing module PM of the device D its communication identifier, the communication identifier of the beneficiary terminal BT, the chosen quantity of units and potentially its password and other data, for example, related to the authorization to divulge its identifier and/or his name to the beneficiary (if this option has not been predefined during registration). It is important to note that the donor terminal DT can transmit the data necessary for the transfer by SMS or by electronic service rather than by means of a radio telephone link.

Upon receiving the data from the donor, the processing module PM verifies in its database DB that the identifier supplied by the requesting donor is registered there and that the password supplied is identical to the one stored in the look-up of said identifier.

If it is not, the processing module PM can, for example, refuse the request or propose that the client register or resend at least some of the data. On the other hand, if the data match, the processing module PM accesses the ABE1 equipment (which manages the accounts of the donor terminal DT and the beneficiary terminal BT here) to check whether the quantity of units that the requesting donor terminal has is at least equal to the quantity of units chosen.

If so, the processing module PM establishes a connection with the ABE1 equipment (arrow F2), to instruct it to proceed with the real-time transfer of the chosen quantity of units from the donor account to the beneficiary account. The ABE1 equipment debits the donor account by the chosen quantity of units and credits the beneficiary account with this same chosen quantity of units. The beneficiary terminal BT can then use them immediately.

Preferably, as shown in FIG. 2, short SMS-type messages are then generated by the processing module PM and sent, by Node Bs NB1 and NB2, to the donor terminal DT (arrow in dashes F3) and/or to the beneficiary terminal BT (arrow in dashes F4), to tell them that the transfer of units has been made. The message sent to the beneficiary terminal BT (arrow F4) contains the quantity of units transferred, and potentially the identifier of the donor terminal DT and/or the name of the donor if the processing module PM is authorized to do so.

If the quantity of units that the requesting donor has in his donor account is less than the quantity of units chosen, there are two possible situations: the processing module PM can refuse the transfer request (and report it to the donor terminal DT over the link established (arrow F1) or by means of a short SMS-type message), or the processing module PM can propose that the donor terminal DT buy units (via the link established (arrow F1) or by means of a short SMS-type message). In this last situation, either the donor terminal D refuses the purchase and the transfer request is refused, or the donor terminal D agrees to the purchase and indicates the quantity of units that it wants to buy, and preferably its password. In this last case, the processing module PM accesses the ABE1 equipment to ask it to credit the donor account with the quantity of units specified and bill it for that quantity. The procedure for transferring units can then continue as indicated above.

Figure 3:
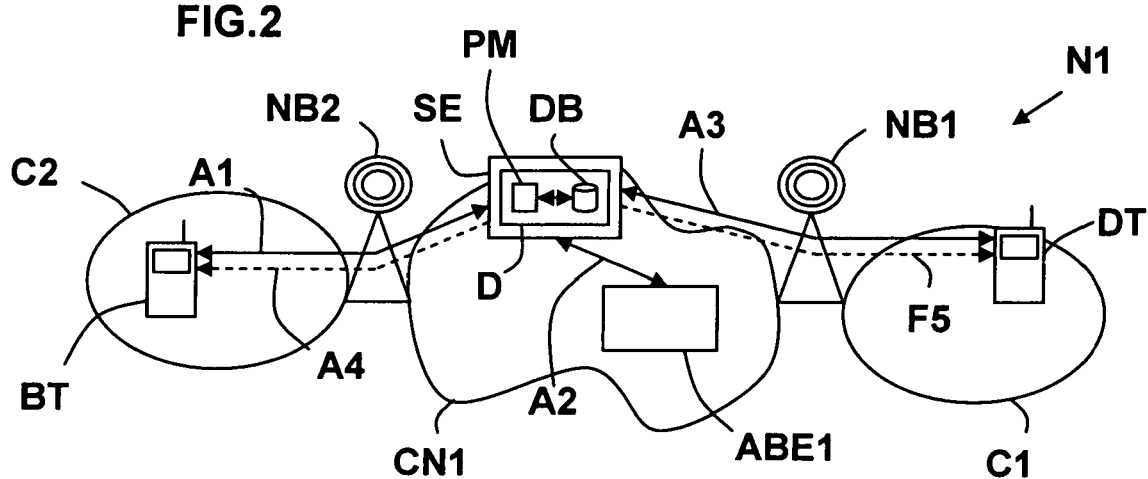
FIG. 3 shows, in a very schematic way, a mobile network equipped with one embodiment of the control device in the invention, and the connections between communication terminals and said device that make it possible for a mobile donor terminal to transfer units of connection time from its own account to the account of a mobile beneficiary terminal, following a request from the latter.

Please refer now to FIG. 3 to see an example of a transfer of units at the initiative of a beneficiary terminal BT.

In this example, the user of a beneficiary terminal BT (here momentarily located in cell C12 of network N1) wants a donor to transfer to his beneficiary account a chosen quantity of units stored in its donor account. To do so, the beneficiary terminal BT can, for example, establish a radio telephone link with the device D (in fact with the service equipment SE in which it is installed), via Node B NB2, which controls cell C12 in which it is located (arrow F1). This link F1 allows the beneficiary terminal BT to send the processing module PM of device D its communication identifier, the chosen quantity of units, and potentially other data, like for example a "very urgent"-type message. It is important to note that the beneficiary terminal BT can transmit the data necessary for the transfer by SMS or by electronic service rather than by means of a radio telephone link.

When it receives the data from the beneficiary, the processing module PM looks in its database DB to see whether the identifier supplied by the requesting beneficiary is registered there and matches the identifier of at least one donor terminal DT. If that is not the case, the processing module PM refuses the request. On the other hand, if it is the case, there are two possible situations if the identifier given by the requesting beneficiary is registered and matches one or more identifiers of the donor terminal DT.

If there is only one identifier of the donor terminal DT, the processing module PM first determines in the database DB if the donor has specified terms of transfer.

If, for example, the donor wants the transfer to be made automatically without giving his consent and the chosen quantity of units is less than or equal to the quantity authorized, the processing module PM accesses the ABE1 equipment (which manages the accounts of the donor terminal DT and the beneficiary terminal BT here) in order to verify whether the quantity of units that the donor has is at least equal to the quantity of units chosen.

If so, the processing module PM establishes a connection with the ABE1 equipment (arrow F2) to instruct it to proceed with a real-time transfer of the chosen quantity of units from the donor account to the beneficiary account. The ABE1 equipment debits the donor account by the chosen quantity of units and credits the beneficiary account for that same chosen quantity of units. The beneficiary may then use them immediately.

Preferably, as shown in FIG. 3, short SMS-type warning messages are then generated by the processing module PM and sent via Node Bs NB2 and NB1, to the beneficiary terminal BT (arrow in dashes F4) and/or to the donor terminal (arrow in dashes F5) to tell them that the transfer of units has been made. The message sent to the donor terminal (arrow F5) contains, for example, the quantity of units transferred and the identifier of the beneficiary terminal BT and/or the beneficiary's name.

If the quantity of units that the donor terminal DT has in its donor account is less than the quantity of units chosen, there are two possible situations: the processing module PM can refuse the transfer request (and report it to the beneficiary terminal BT via the link established (arrow F1) or by means of a short SMS-type message), or the processing module PM can make an offer to the donor terminal DT (via a telephone link (arrow F3) or by means of a short SMS-type message) to buy some units. In this last situation, either the donor terminal D refuses the purchase and the transfer request is rejected, or the donor terminal D accepts the purchase and indicates the quantity of units that it wants to buy and preferably its password. In this last case, the processing module PM accesses the ABE1 equipment to ask it to credit the donor account with the quantity of units specified and to bill it for that quantity. The procedure for the transfer of units can then continue as indicated above.

If the donor has asked that his consent be required before any transfer (or before the transfer to the requesting beneficiary terminal), the processing module PM establishes a telephone link with the donor terminal DT or sends it a short SMS-type message (arrow F3) to tell it the quantity of units requested (chosen), the identifier of the requesting beneficiary terminal BT and/or the name of the beneficiary, and to ask for his consent.

If the donor terminal refuses the transfer or does not respond for a period above a chosen threshold, the transfer request is rejected. The beneficiary terminal is then told of the rejection either by telephone or by a short SMS-type message.

If the donor terminal accepts the transfer, we go back to the transfer procedure described above which corresponds to the case where stored data specify that the donor does not have to give his prior consent.

If the donor terminal has several identifiers, the processing module PM picks at least one of them based on at least one chosen criterion. Several criteria may be used, separately or in combination, particularly an availability criterion of the donor terminal, a priority criterion based on levels of priority attributed to the different donor terminals concerned and a capacity criterion based on the quantity of units available in the different donor accounts concerned.

If several donor terminals have been picked by the processing module PM, it asks the requesting beneficiary terminal BT to select one of them, via a telephone link or by means of a short SMS-type message.

If a single donor terminal has been designated by the processing module, it is the one used for the transfer.

The transfer procedure described above, which is for a case where there is only one donor terminal identifier stored that matches the identifier of the requesting beneficiary terminal, then applies in full to this stage with the donor terminal used by the processing module PM or selected by the beneficiary terminal BT.

It is important to note that the processing module PM can be designed in such a way as to carry out a procedure for the transfer of units at the initiative of a beneficiary terminal BT, provided that the beneficiary account does not have a quantity of units above a chosen threshold. To do so, when the processing module PM receives a request to transfer units from a beneficiary terminal BT, it accesses the ABE1 equipment to check whether the quantity of units stored in the account of the beneficiary concerned is less than the chosen threshold. If it is, the transfer procedure continues. If not, the transfer request is rejected, and the requesting beneficiary terminal BT is informed of it by telephone link or by means of a short SMS-type message.

When a beneficiary terminal BT makes a request to transfer units, it can be an emergency situation in which the number of units that remains in its beneficiary account cannot allow it to establish communication with the device D. Consequently, it is possible for the processing module PM to be designed to transfer the cost of the communication to the donor account. To do so, the processing module PM instructs the ACE1 equipment to debit the donor account, instead of the beneficiary account, by a quantity of units of connection time that corresponds to the cost of the communication initiated by the requesting beneficiary terminal.

It would also be possible for a beneficiary terminal BT to have free access (from its viewpoint) automatically to an emergency service to request a transfer of units if at least one donor authorizes it to proceed this way. In other words, rather than making a sort of transfer request in PCV, the transfer is accessible automatically, in an emergency, to each terminal declared a beneficiary by a donor if the latter has subscribed to the emergency service for automatic transfer of units, and the terms (data) for the emergency procedure to request a transfer of units have been set and registered in the database DB. This makes it possible to "guarantee" in case of emergency that a beneficiary terminal could make its request for a transfer of units. Thus, when a terminal whose beneficiary account does not have a sufficient number of units to make a request for a transfer of units carries out an emergency procedure to request a transfer of units, the processing module PM is informed of it by the network. It would be possible for the beneficiary terminal to dial an emergency communication identifier to indicate that it wishes to carry-out the emergency procedure. The processing module PM would then access the database DB to determine if that terminal was authorized by a donor to use that emergency procedure. If not, the emergency procedure is rejected. On the other hand, if so, the processing module PM authorizes the use of the emergency procedure and instructs the accounting and/or billing equipment ABE1 that manages the account of the donor terminal DT to debit that account by the quantity of units of connection time that corresponds to the cost of the emergency procedure.

To prevent beneficiaries from using the emergency procedure frequently just to have units transferred by one or more donors, it would be possible for an emergency procedure to be able to be used by a beneficiary only a chosen number of times within a given time interval. This option then becomes part of the terms of transfer that are stored in the form of data in the database DB.

Figure 4:
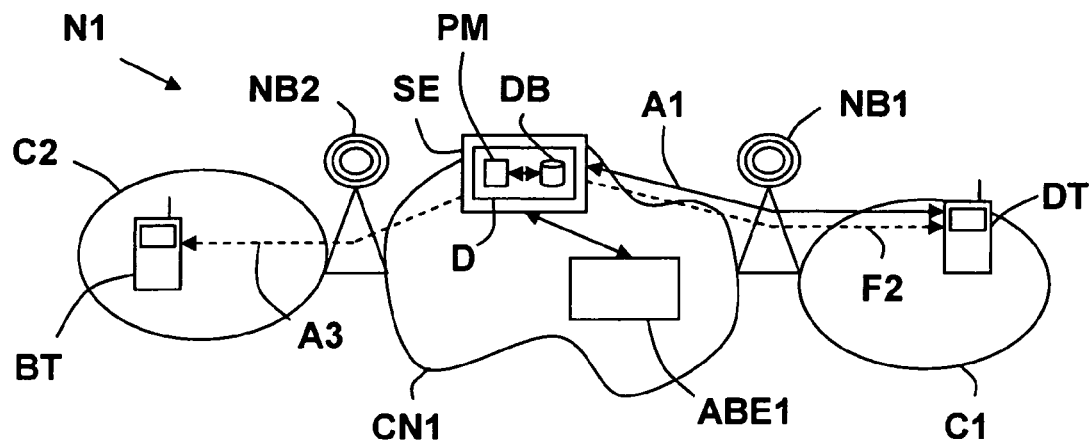
FIG. 4 shows, in a very schematic way, a mobile network equipped with one embodiment of the control device in the invention, and the connections between communication terminals and said device that make it possible for a mobile donor terminal to modify the list of its mobile beneficiary terminals and/or an option to transfer units of connection time to the latter

Please refer now to FIG. 4 to see an example of a change in the data associated with a donor terminal DT registered in the database DB.

All data stored in the database DB can be changed at the request of a donor terminal DT.

To make a change in its transfer data, a donor terminal DT first establishes a radio telephone link with the device D (actually with the service equipment SE in which it is installed) via Node B NB1, which controls the cell (here C11) in which it is located (arrow F1). This link F1 allows the donor terminal DT to send the processing module PM of the device D its communication identifier, as well as potentially its password, then the information that it wants to change, add or, delete. For example, the donor may wish to add and/or delete from his restricted list one or more beneficiary terminals, and/or change the quantity of units that it agrees to transfer to a given beneficiary terminal each time or over a chosen period of time. The donor terminal may also ask to be deleted from the database DB and not participate in any more transfers of units.

When it receives the information supplied by the donor, the processing module PM updates the data associated with the identifier of its donor terminal DT in the database DB.

Preferably, once the processing module has updated its database DB, at the request of a donor, it generates a message to its donor terminal DT to inform it that it has made the changes requested (arrow in dashes F2). For example, this message may be a short SMS-type message.

If the changes involve at least one beneficiary terminal BT, the processing module PM also preferably generates a message to each beneficiary terminal BT to inform them of the change (or changes) that concern it (arrow in dashes F3). For example, this message may be a short SMS-type message.

The preceding description describes an example of how the invention is used in a case where the donor and beneficiary terminals are connected to the same network. But the invention can also be used in a case where the donor and beneficiary terminals are connected to networks belonging to different operators. Such a situation is illustrated schematically in FIG. 5, as a non-limiting example.

Figure 5:
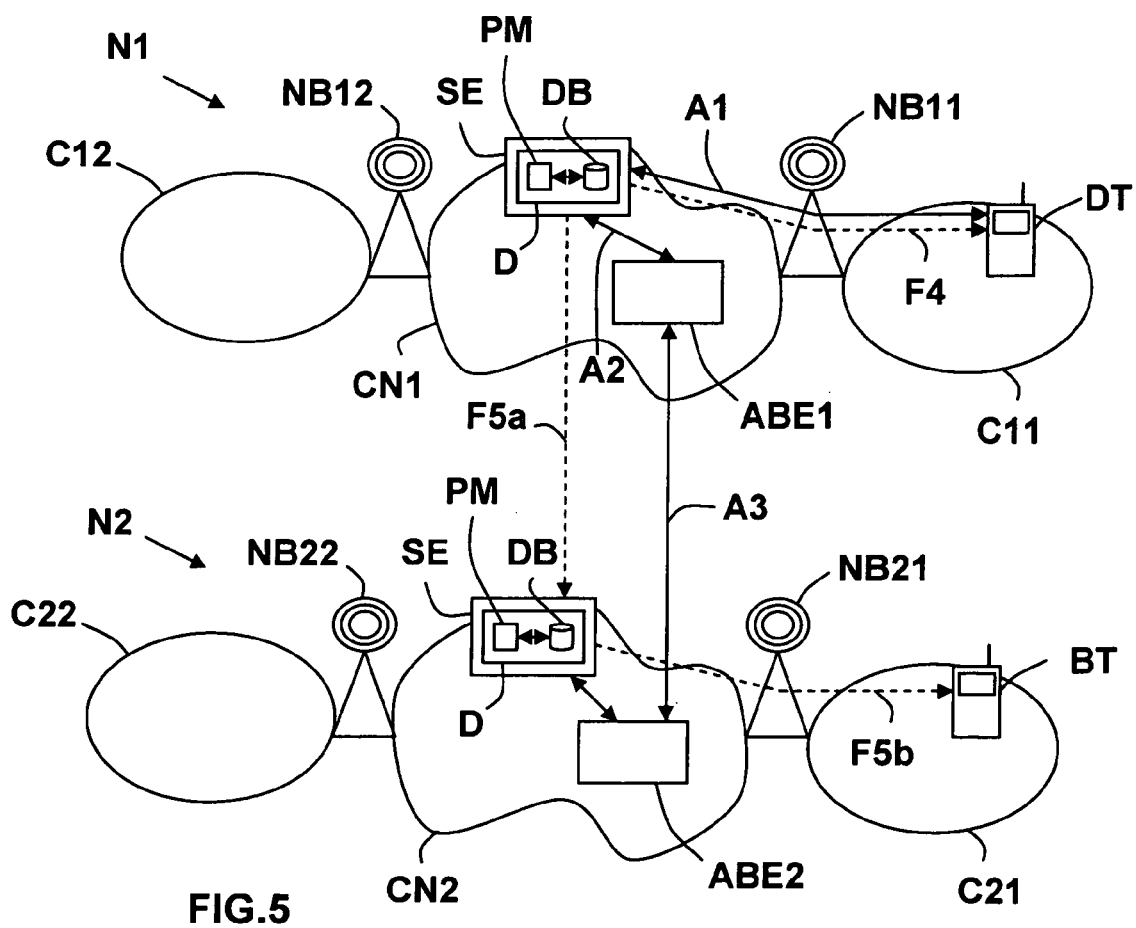
FIG. 5 shows, in a very schematic way, two mobile networks each equipped with an embodiment of the control device in the invention, and the connections between communication terminals and said devices that make it possible for a mobile donor terminal connected to one of the networks, on its own initiative, to transfer units of connection time from its own account to the account of a mobile beneficiary terminal connected to another network.

In the example illustrated in FIG. 5, a first mobile network N1 and a second mobile network R2 are connected by the respective core networks CN1 and CN2, and each has accounting and/or billing equipment, ABE1, ABE2 managing the accounts of the mobile terminals of their respective clients.

As illustrated, each network N1, N2 has the control device D in the invention, the type described previously. Here, the processing module PM, which is installed in one of the two networks (for example N1), is capable of establishing a link not only with the accounting and/or billing equipment ABE1 of its network N1, but also with the accounting and/or billing equipment ABE2 of the other network N2, either "directly," or indirectly via the control device D of that other network N2. Moreover, the two sets of accounting and/or billing equipment ABE1 and ABE2 are capable, when instructed by a control device D, of exchanging data in such a way as to be able to credit or debit an account of a client terminal in their network by transferring units.

The operation of the control devices D is identical to that described previously, and also offers the capacity of establishing (direct or indirect) links with the accounting and/or billing equipment of the network connected to their own network.

In the example illustrated in FIG. 5, a donor terminal, located in cell C11 of the first network N1 and connected to it, wants to transfer a chosen quantity of units from its donor account to the beneficiary account of a beneficiary terminal BT, located in cell C21 of the second network N2 and connected to it.

It is assumed here that the donor terminal DT is registered with the device D of the first network N1 (the registration procedure is roughly identical to the one described with reference to the first example).

The donor terminal DT first establishes a radio telephone link with the device D (actually with the service equipment SE in which it is installed), via Node B NB11, which controls cell C11 in which it is located (arrow F1). This link F1 allows the donor terminal DT to send the processing module PM of the device D of the first network N1 its communication identifier, the communication identifier of the beneficiary terminal BT, the chosen quantity of units, and potentially its password and other data, for example related to authorization to divulge its identifier and/or its name to the beneficiary (if this option has not been defined ahead of time, during registration).

When it receives the data from the donor terminal DT, the processing module PM of the device D on the first network N1 verifies in its database DB that the identifier supplied by the requesting donor terminal DT is registered there and that the password supplied is identical to the one stored in the look-up table of said identifier. If not, the processing module PM can, for example, refuse the request or make an offer to the client to register or to resend at least some of the data. On the other hand, if the data match, the processing module PM accesses the ABE1 equipment of the first network R1 (which manages the account of the donor terminal DT here) (arrow 2) to check whether the quantity of units that the requesting donor terminal DT has is at least equal to the quantity of units chosen.

If so, the processing module PM establishes a link with the ABE1 equipment of the first network N1 to order it to connect to the ABE2 equipment of the second network N2 (which manages the account of the beneficiary terminal BT here) (arrow 3), to proceed together to transfer in real time the chosen quantity of units from the donor's account to the beneficiary's account. The ABE1 equipment debits the donor's account by the chosen quantity of units and the ABE2 equipment credits the beneficiary's account for that same chosen quantity of units. The beneficiary terminal BT can then use it immediately.

Preferably, as shown in FIG. 5, short SMS-type warning messages are then generated by the processing module PM and sent via Nodes Bs NB11 (of network N1) and NB21 (of network N2) to the donor terminal DT (arrow in dashes F4) and/or to the beneficiary terminal BT either "directly" or indirectly by the device D on the second network N2 (arrow in dashes F5a and/or F5b), in order to inform them that the transfer of units has been made. The message sent to the beneficiary terminal BT (arrows F5a and/or F5b) contains the quantity of units transferred, as well as potentially the identifier of the donor terminal DT and/or the name of the donor if the processing module PM of the device D of the first network N1 is authorized to do so.

If the quantity of units that the requesting donor terminal DT has in its donor account is less than the chosen quantity of units, there are two possible situations: the processing module PM can refuse the request for transfer (and inform the donor terminal DT of it via the link established (arrow F1) or by means of a short SMS-type message), or the processing module PM can make an offer to the donor terminal DT (via the link established (arrow F1) or by means of a short SMS-type message) to buy some units. In this last situation, either the donor terminal D refuses the purchase and the transfer request is rejected, or the donor terminal D accepts the purchase and indicates the quantity of units its wishes to buy and preferably its password. In this last case, the processing module PM accesses the ABE1 equipment to ask it to credit the donor's account for the quantity of units specified and to bill it for that quantity. The procedure for transferring the units can then continue as indicated above.

The procedure for transferring units at the initiative of a beneficiary terminal BT is similar to that described previously with reference to FIG. 3, with the adaptations mentioned above, required by the coupling of the two networks and by the fact that they have separate ABE1 and ABE2 equipment to manage the accounts of the mobile terminals of their respective clients.

The control device D in the invention, and particularly its processing module PM, can be made in the form of electronic circuits, software (or computer) modules or a combination or circuits and software.

The invention is not limited to the embodiments of the control device and control process described above just as an example, but includes all variations that a person skilled in the art may envisage within the context of the following claims.

The invention claimed is:

1. A control device (D) for transferring units of connection time for a communication network (N1) having accounting and/or billing equipment (ABE1), characterized by the fact that it includes processing means PM designed, when a request is received to transfer a chosen quantity of units of connection time for the benefit of a beneficiary account, associated with the communication identifier of a beneficiary communication terminal (BT) connected to a communication network (R1;R2), to access a first set of accounting and/or billing equipment (ABE1) managing an account of a donor associated with the communication identifier of a donor communication terminal (DT) connected to another potential communication network (R1), to verify whether the quantity of units of connection time that said donor terminal (DT) has is at least equal to said chosen quantity, and if so, to instruct said first equipment and other potential accounting and/or billing equipment (ABE1; ABE2) managing said beneficiary account to proceed with a real-time transfer of a quantity of units of connection time at most equal to said chosen quantity from the donor account to the beneficiary account.

2. The device in claim 1, characterized by the fact that it has memory means (MM) in which are stored data defining look-up tables with identifiers of donor terminals (DT) and at least one identifier of a beneficiary terminal (BT).

3. The device in claim 2, characterized by the fact that said look-up tables (DB) have data indicating that a donor authorizes transfers of units for the benefit of any communication terminal.

4. The device in claim 2, characterized by the fact that said look-up tables (DB) contain data representative of the quantity of units of connection time that can be transferred to each beneficiary account.

5. The device in claim 4, characterized by the fact that said look-up tables (DB) contain data representative of the quantity of units of connection time that can be transferred to each beneficiary account either during a chosen period of time or at each request to transfer units.

6. The device in claim 2, characterized by the fact that said look-up tables (DB) contain data indicating that a donor authorizes transfers of units for the benefit of a beneficiary account without any prior authorization request procedure.

7. The device in claim 2, characterized by the fact that said look-up tables (DB) contain data indicating that a donor authorizes a beneficiary terminal (BT) to use an emergency procedure to request a transfer of units when his account no longer has enough units to make a normal request to transfer units; said emergency procedure is paid for by the donor account and takes place with no prior authorization request procedure, and said processing means (PM) are designed, in case of detection of an emergency procedure to request a transfer of units coming from a beneficiary terminal (BT) whose beneficiary account does not have a sufficient number of units to make a normal request to transfer units at its expense, but which is authorized by a donor to benefit from said emergency procedure, to authorize the use of the emergency procedure and to instruct said accounting and/or billing equipment (ABE1) managing said donor account to debit that donor account by the quantity of units of connection time that corresponds to the cost of said emergency procedure.

8. The device in claim 2, characterized by the fact that said look-up tables (DB) contain data indicating that a donor authorizes transfers of units for the benefit of a beneficiary account after a prior authorization request.

9. The device in claim 2, characterized by the fact that said look-up tables (DB) contain data indicating that a donor does not authorize communication to a beneficiary terminal BT of the identifier of its donor terminal (DT) and/or its name.

10. The device in claim 1, characterized by the fact that said processing means (PM) are designed to handle a request for transfer of units that comes from a donor terminal (DT) and designates at least one beneficiary terminal (BT) and a chosen quantity of units.

11. The device in claim 1, characterized by the fact that said processing means (PM) are designed to handle a request for transfer of units that comes from a beneficiary terminal (BT) and designates a chosen quantity of units.

12. The device in claim 11, characterized by the fact that said processing means (PM) are designed, when they receive a request to transfer a chosen quantity of units not designating any donor terminal (DT) identifier and coming from a beneficiary terminal (BT) whose identifier is associated in said look-up table (DB) with at least two identifiers of donor communication terminals, to offer the requesting beneficiary terminal (BT) to select one of said donor terminals.

13. The device in claim 12, characterized by the fact that said processing means (PM) are designed to pick among several possible donor terminals at least one of them based on at least one chosen criterion, so as to propose to said requesting beneficiary terminal (BT) each donor terminal verifying each chosen criterion.

14. The device in claim 13, characterized by the fact that said criteria are chosen in a group having at least a communication terminal availability, a level of priority and a quantity of units available.

15. The device in claim 11, characterized by the fact that said processing means (PM) are designed to reject a request for transfer of units in the event of refusal by the selected donor terminal (DT) or in the absence of any response from the selected donor terminal (DT) within a period over and above a chosen threshold.

16. The device in claim 11, characterized by the fact that said processing means (PM) are designed, if a donor terminal (DT) agrees to transfer a quantity of units less than said chosen quantity, to order the transfer of the quantity of units agreed to from the account of the donor to the account of the beneficiary, potentially after sending the beneficiary terminal (BT) a request for agreement related to said quantity of units granted and after receiving agreement from said donor terminal (DT).

17. The device in claim 11, characterized by the fact that said processing means (PM) are designed, when they receive a request to transfer units that comes from a beneficiary terminal (BT), to access the accounting and/or billing equipment (ABE1; ABE2), managing the account of said beneficiary terminal (BT), and to authorize said transfer when the quantity of units stored in said beneficiary account is less than a chosen threshold.

18. The device in claim 11, characterized by the fact that said processing means (PM) are designed to instruct the accounting and/or billing equipment (ACE1) managing the account of the donor terminal (DT) to debit that account by the quantity of units of connection time that corresponds to the cost of the communication initiated by said beneficiary terminal (BT), without debiting the account of said beneficiary terminal (BT), so that said communication is charged to the donor terminal (DT).

19. The device in claim 1, characterized by the fact that said processing means (PM) are designed, when the quantity of units available in the account of the donor terminal (DT) involved in said transfer is less than said chosen quantity, to send said donor terminal (DT) an offer to buy units of connection time, and if said donor terminal (DT) agrees, to send the accounting and/or billing equipment (ABE1) managing the account of the donor terminal (DT) a request to allocate a specified quantity of units to that account, bill said donor and then order said transfer of units.

20. The device in claim 1, characterized by the fact that when a transfer of units requires the prior consent of the donor terminal (DT), said processing means (PM) are designed to order said transfer of units if said consent from the donor terminal (DT) is accompanied by a confidential password.

21. The device in claim 1, characterized by the fact that said processing means (PM) are designed to handle requests to transfer units coming in the form of telephone calls, short SMS-type messages, electronic messages or electronic services.

22. The device in claim 1, characterized by the fact that said processing means (PM) are designed to communicate with said donor terminals (DT) and/or beneficiary terminals (BT) by means of short SMS-type messages.

23. The device in claim 1, characterized by the fact that said donor terminals (DT) and beneficiary terminals (BT) are connected to the same network (N1) belonging to an operator, and said donor account and beneficiary account are managed by the same accounting and/or billing equipment (ABE1) accessible by a communication identifier.

24. The device in claim 1, characterized by the fact that said donor terminals (DT) and beneficiary terminals (BT) are connected to different networks (N1, N2) belonging to different operators, and said donor account and beneficiary account are managed by different accounting and/or billing equipment (ABE1, ABE2) accessible by different communication identifiers.

25. A process of transferring units of connection time, characterized by the fact that when dedicated network equipment (D) receives a request to transfer a chosen quantity of units of connection time to a beneficiary account, associated with the communication identifier of a beneficiary terminal (BT) connected to a communication network (N1; N2), it accesses a first set of accounting and/or billing equipment (ABE1) managing a donor account associated with the communication identifier of a donor communication terminal (DT) connected to another potential communication network (N1) to verify if the quantity of units of connection time that said donor terminal (DT) has is at least equal to said chosen quantity, and if so, to order said first set of equipment (ABE1) and another potential set of accounting and/or billing equipment (ABE1; ABE2) managing said beneficiary account to proceed with a real-time transfer of a quantity of units of connection time at most equal to said chosen quantity from the donor account to the beneficiary account.

* * * * *